Figure 1:
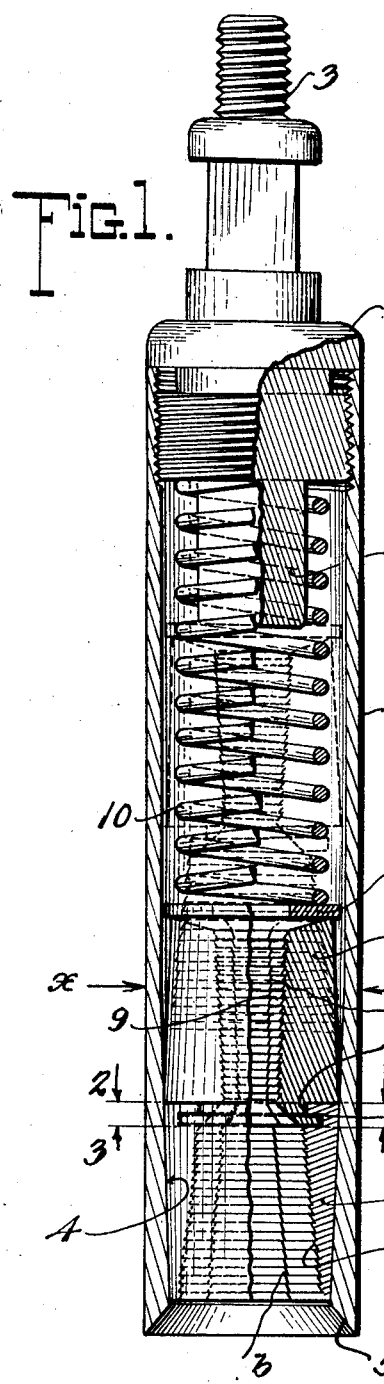

March 8, 1927.

W. A. O'BANNON 1,620,383

SUCKER ROD SOCKET

Filed Dec. 4, 1925

2 Sheets-Sheet 1

Inventor
Walter A. O'Bannon
By Robb, Robb & Hill
Attorneys

March 8, 1927.　　　　　W. A. O'BANNON　　　　1,620,383
SUCKER ROD SOCKET
Filed Dec. 4, 1925　　　　2 Sheets-Sheet 2
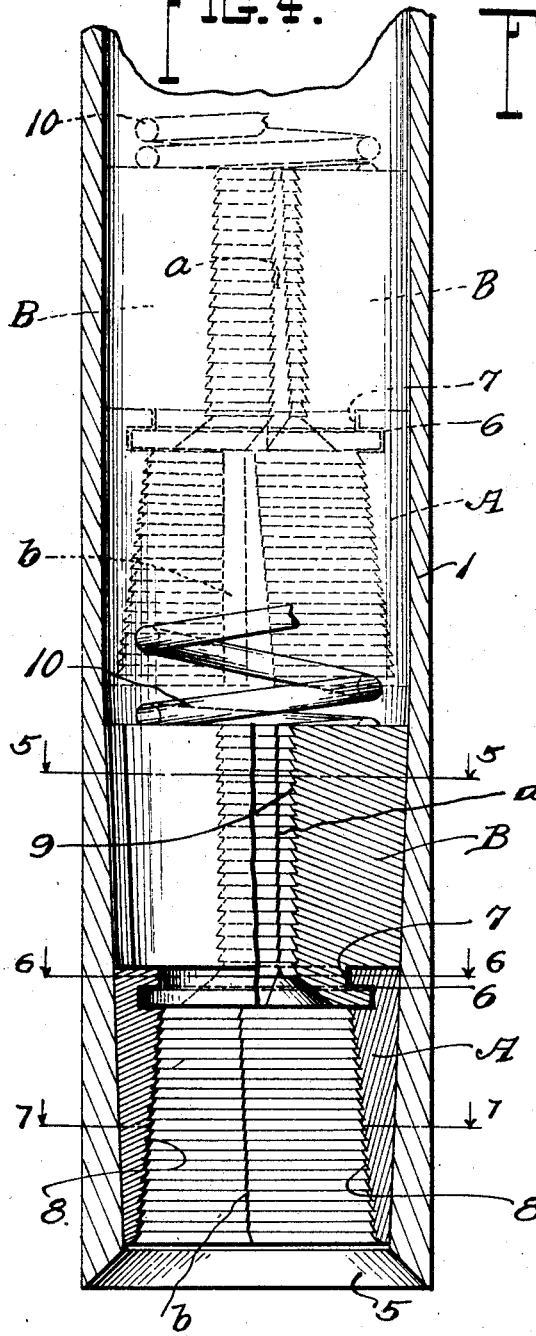
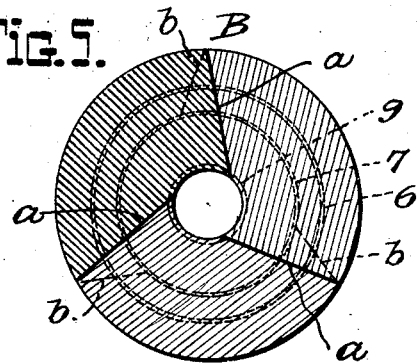
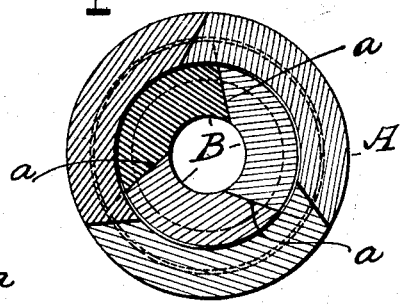
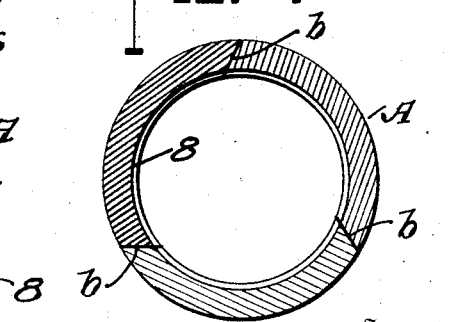
Inventor
Walter A. O'Bannon
By Robt Cobb Hill
Attorneys Patented Mar. 8, 1927.

1,620,383

UNITED STATES PATENT OFFICE.

WALTER A. O'BANNON, OF TULSA, OKLAHOMA.

SUCKER-ROD SOCKET.

Application filed December 4, 1925. Serial No. 73,169.

The present invention appertains to improvements in sucker rod sockets and it is characterized as to novelty by the provision of a sectional slip construction, the various sections of which are so arranged with respect to each other as to prevent any likelihood of an accidental displacement of the parts such that dumping would occur.

The primary object of my present improvements is to provide a duplex slip unit having plural bores of differing diameters so as to be able to catch and pull sucker rods of various sizes and regardless of whether the break occurs in the joint or elsewhere. To this end the slip unit comprises two separate, expansible sections, one having a relatively large bore and the other having a relatively smaller bore, said sections having an interlocking connection so that one section constitutes holding means for the other while permitting free expansion of either or both.

It is further an important feature of my slip arrangement that a peculiar division of each section into segments is made, so that at no time within the limits of expansion permitted by the barrel with which they cooperate can the interlocking connection become disengaged or a segment of one section assume an aligned or registering position with a corresponding segment of the other section which would result in a dropping of such segments,—that dumping action hereinbefore referred to.

A still further object in view is to provide a slip construction which, by virtue of its shape, will best lend itself to proper heat treatment for tempering, whereby greater durability is insured and which, owing to the sectional construction, enables replacement of breakage of parts without loss of the whole.

It has also been my aim to provide a construction of reversible slips which enables the slip unit as a whole to be turned end for end dependent upon whether the break occurs at the joint or intermediate the length of the rod section, the position of which break determines which set of slips must be employed.

Other and further objects and advantages of the invention will be hereinafter set forth and the novel features thereof defined by the appended claims.

Figure 2:
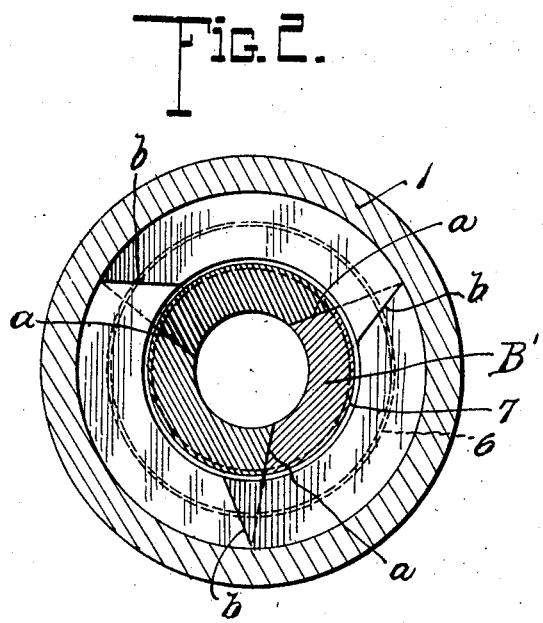
Figure 3:
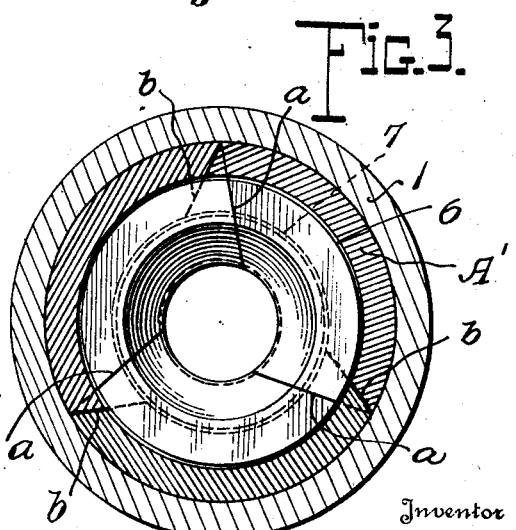

Referring to the drawings:

Figure 1 is a vertical sectional view through a sucker rod socket, embodying the reversible type of slip unit;

Figures 2 and 3 are horizontal sectional views on the lines 2—2 and 3—3 respectively of Figure 1, and looking in the directions of the respective arrows;

Figure 4 is an enlarged fragmentary sectional view showing the socket embodying the non-reversible type of slip unit;

Figures 5, 6 and 7 are sectional views through the slip unit shown in Figure 4, omitting the casing and taken on the respective lines 5—5, 6—6 and 7—7 of said figure.

Like reference characters designate corresponding parts throughout the several figures of the drawing.

Referring to the drawings, 1 designates the barrel or bowl of the sucker rod socket which at its upper end is interiorly threaded to receive the removable head 2 having a threaded pin 3 by means of which connection is made to the operating means. At the lower end the barrel is formed with an internal taper 4 extending downwardly from about the point $x$—$x$ to the mouth which is reamed out to form the bevel 5 designed to facilitate "finding" of the broken rod.

So far as this construction of barrel per se is concerned, I do not lay any particular claim to novelty herein, my invention residing primarily in the gripping means used therewith which I shall refer to hereinafter as the slip unit.

Referring, first, to that form of slip unit which is shown in Figures 4 to 7, it will be observed that such unit is composed of the lower section A and the upper section B. These sections cooperate and have the interlocking engagement which is secured by the provision of an internal groove 6 about the upper part of the lower section A and the external groove 7 about the lower portion of the upper section B. So long as the slip unit remains in the barrel these sections operate conjointly by virtue of this interlocking engagement and it is obvious that the upper set or section B acts at all times as a follower or holding means for the lower set of slips A.

Exteriorly the slip unit as a whole is tapered to conform to the taper of the barrel 1 and each of the slip sections A and B is divided longitudinally into a series of segments as best shown in Figures 5 and 7. Each of the sections as disclosed herein is divided into three segments and in order that these segments may never assume a registering or aligned position the splitting of the sections is made on different angles. In other words, referring to Figure 5, it will be observed that the line of division designated *a* of the upper set of slips passes to one side of the longitudinal axis of the slip body while the division line *b* of the lower section extends on a line which would pass the opposite side of the axis of the slip unit. The angularity of these lines of division may vary from that disclosed in the drawings and I do not wish to be limited in this respect so long as the splitting is arranged in such a manner that there is always an overlap of the segments of one section with respect to the segments of the other.

The lower section A is provided with a relatively large tapered bore having wickers 8 therein while the upper section is provided with a relatively smaller bore similarly formed with wickers 9. The bore of the upper section may be either tapered or straight, the latter being the form illustrated in the drawings. The variance in the size of the bores of these sections is to permit of the use of the slip construction for pulling rods regardless of whether the break occurs at the joint which would be taken care of by the lower section or at a point intermediate the length between the joints, in which event the operation would be taken care of by the upper section, if a straight bore is employed in the upper section.

In the use of the device the socket is lowered into contact with the broken rod and further lowering causes the slip unit as a whole to move upwardly in the barrel 1, as shown in dotted lines in Figure 4, compressing the spring 10 which is employed to normally hold the slip body in its lowermost position. This causes the slip unit to pass out of the tapered portion of the barrel 1 and allows the expansion of the respective sections, each to a greater degree at the bottom than at the top. In other words, the opening and closing action is scissors-like and this produces a very strong biting action when the barrel is raised and the slip body is brought back into cooperation with the tapered portion of the barrel.

Referring to the form of socket which is disclosed in Figure 1, it will be noted that the slip unit is formed of the lower section A' and the upper section B', each having a tapering wickered bore preferably, the tapers being in opposite directions. Exteriorly the slip unit which has the same interlocking engagement as that described with reference to the unit of Figure 4 tapers from the center or point of connection oppositely toward its respective ends. With this type of construction the slip unit may be reversed so that the section B' will be lowermost while the section A' is uppermost. This reversible form of slip unit is particularly advantageous in that it gives a greater range of utility with rods of varying sizes and it is especially useful where the point of breakage is known. In other words, if from the portion of the rod which has been withdrawn it appears that the break is at the joint, the reversible unit may be employed with the section A' lowermost. On the other hand, if the break is between the joints, as disclosed by the portion of the rod which has been removed, the unit is reversed so that the section B' is lowermost. It will be apparent that by using the two sets of slips as herein disclosed it is possible to select the particular set with a section which will fit the particular section of the rod which is broken.

In connection with the reversible form, I preferably use a washer 11 to engage with the top of the slip unit and form a seat for the spring 10 which will prevent the spring from passing into the slip section. I also preferably provide an extension 2' on the head 2 to act as a stop which will limit the upward movement of the slip body so as not to crush the spring. When the rod has been pulled and it is desired to disengage the socket therefrom it is only necessary to displace the head 2 from the barrel more or less which will enable the slips to be driven upward slightly and effect a ready release of the gripping action of the slips.

There are a number of advantages for the construction of slip unit which is disclosed hereinbefore and some of these will now be referred to.

In the first place, it will be apparent that this form of device enables reserve slips to be carried within the barrel or bowl when not in use and therefore such reserve slips are not likely to become lost or misplaced, and when in the barrel these reserve slips act as a check member or support for the slips which are in use, preventing the possibility of the segments of the slip which are in use being pushed upwardly with relation to the other segments.

Another important advantage resides in the fact that in this construction of slip unit the sections are more or less uniform in thickness and this enables a better heat treatment than where the slip body is relatively long and the top part is considerably thicker than the lower. Where such variation of the thickness is present the treatment in tempering tends to harden one portion to a greater degree than the other and this results in a failure or breakage of the slip in many instances. In fact this has been a very prominent difficulty with these tapered or wedge slips heretofore and I am able to overcome this by virtue of using a two part slip body with substantially uniform thickness of the respective sections.

Another great advantage for this form of slip lies in the ability to replace parts which become broken. Very frequently in view of the thinness of the lower section or that section which has the enlarged bore a breakage occurs by virtue of the stresses which have been imposed upon it and this in the ordinary construction of slip practically results in a discarding of the unit long before its full use has been had. However, with my sectional form of slip unit a broken part may be readily replaced at a small cost as compared with the replacement of the whole.

Having thus described my invention, what I claim as new is:—

1. A slip body or unit composed of superposed sections; and means interlocking the sections together for simultaneous movement in a rod socket.

2. A slip body or unit composed of expansible slip sections each divided into plural segments, the segments of one section overlapping the segments of the other.

3. A slip body or unit composed of expansible slip sections having bores of different diameters, and interengaging means conjoining the sections while permitting independent action thereof.

4. A slip body or unit composed of conjoined slip sections, each section being split longitudinally into segments, the lines of split of at least one section being non-radial.

5. A slip body or unit composed of conjoined sections, each section being split into plural segments, the lines of split of one section being out of alignment with the lines of split of the other section.

6. A slip body or unit composed of superposed sections, each section being divided into a plurality of segments, the lines of division between the segments of one section being disposed out of alinement with the lines of division between the segments of the other section.

7. A slip body for rod sockets comprising upper and lower sections, each section being split one or more times, the line of split of one section being on an angle differing from the angle of the line of split of the other section.

8. A slip body for rod sockets composed of independently expansible gripping sections and means for connecting the sections together to follow each other in up and down movements in the socket.

9. A slip body for rod sockets composed of separate slip sections having their abutting ends interlockingly overlapping, said sections having opposing wickered bores.

10. A rod socket comprising a barrel having a tapering bore, a slip body therein composed of reversible upper and lower gripping sections, said sections being reversely tapered to enable disposition of either section in operative position in the tapered portion of the barrel, the other section constituting the holding means for said operative section.

11. A rod socket comprising a barrel having a tapering bore, a reversible slip unit therein composed of upper and lower expansible gripping sections having bores of different diameters, said sections being formed with an interlocking abutting connection permitting of independent expansion and contraction of said sections.

12. A two part slip unit for sucker rod sockets, composed of upper and lower joined parts, each part having a substantially uniform thickness.

13. A two part slip unit for sucker rod sockets, composed of upper and lower joined parts, each part constituting an independent gripping means having a thickness substantially uniform throughout its length.

In testimony whereof I affix my signature.

WALTER A. O'BANNON.